United States Patent [19]

Kainulainen

[11] Patent Number: 5,796,793
[45] Date of Patent: Aug. 18, 1998

[54] HIERARCHICAL SYNCHRONIZATION METHOD

[75] Inventor: Jukka Kainulainen, Helsinki, Finland

[73] Assignee: Nokia Telecommunications Oy, Espoo, Finland

[21] Appl. No.: 700,379

[22] PCT Filed: Feb. 28, 1995

[86] PCT No.: PCT/FI95/00113

§ 371 Date: Aug. 14, 1996

§ 102(e) Date: Aug. 14, 1996

[87] PCT Pub. No.: WO95/24801

PCT Pub. Date: Sep. 14, 1995

[30] Foreign Application Priority Data

Mar. 1, 1994 [FI] Finland .................................. 940980

[51] Int. Cl.$^6$ .................................................. H04L 12/44
[52] U.S. Cl. ....................... 375/356; 375/357; 370/408; 370/503
[58] Field of Search .................................. 375/354, 356, 375/357; 370/254, 256, 390, 400, 408, 410, 503, 507, 235, 236, 238; 364/242.94, 242.6, 242.8

[56] References Cited

U.S. PATENT DOCUMENTS

| 2,986,723 | 5/1961 | Darwin et al. . | |
| 4,736,393 | 4/1988 | Grimes et al. | 375/356 |
| 4,837,850 | 6/1989 | Maisel et al. . | |
| 4,939,752 | 7/1990 | Literati et al. | 370/238 |

FOREIGN PATENT DOCUMENTS

| 435 395 | 7/1991 | European Pat. Off. . |
| 92358 | 7/1994 | Finland . |
| 94/11965 | 5/1994 | WIPO . |

OTHER PUBLICATIONS

IBM Technical Disclosure bulletin, vol. 25, No. 11B, Apr. 1983, L. S. Rogers, "Clock Source Selection Method in Distributed Communication System Networks" pp. 6293-6298.

Primary Examiner—Don N. Vo
Assistant Examiner—Amanda T. Le
Attorney, Agent, or Firm—IP Group of Pillsbury Madison & Sutro LLP

[57] ABSTRACT

The method for synchronizing the nodes in a telecommunications system utilizing a hierarchical message-based synchronization. The object is to make all the nodes in the system operate at the same clock frequency by letting the system synchronize itself with a single master clock source. The system nodes interchange synchronization messages indicating its priority in the internal synchronization hierarchy of the system. There are several transmission lines between two nodes and the same synchronization signature is transmitted over more than one of these transmission lines. The node copies the signature received from one interface connected to a node in such way that it also applies to the other interfaces connected to the same neighboring node. Thereafter comparing means perform comparison of the signatures and selection of synchronization source.

8 Claims, 6 Drawing Sheets

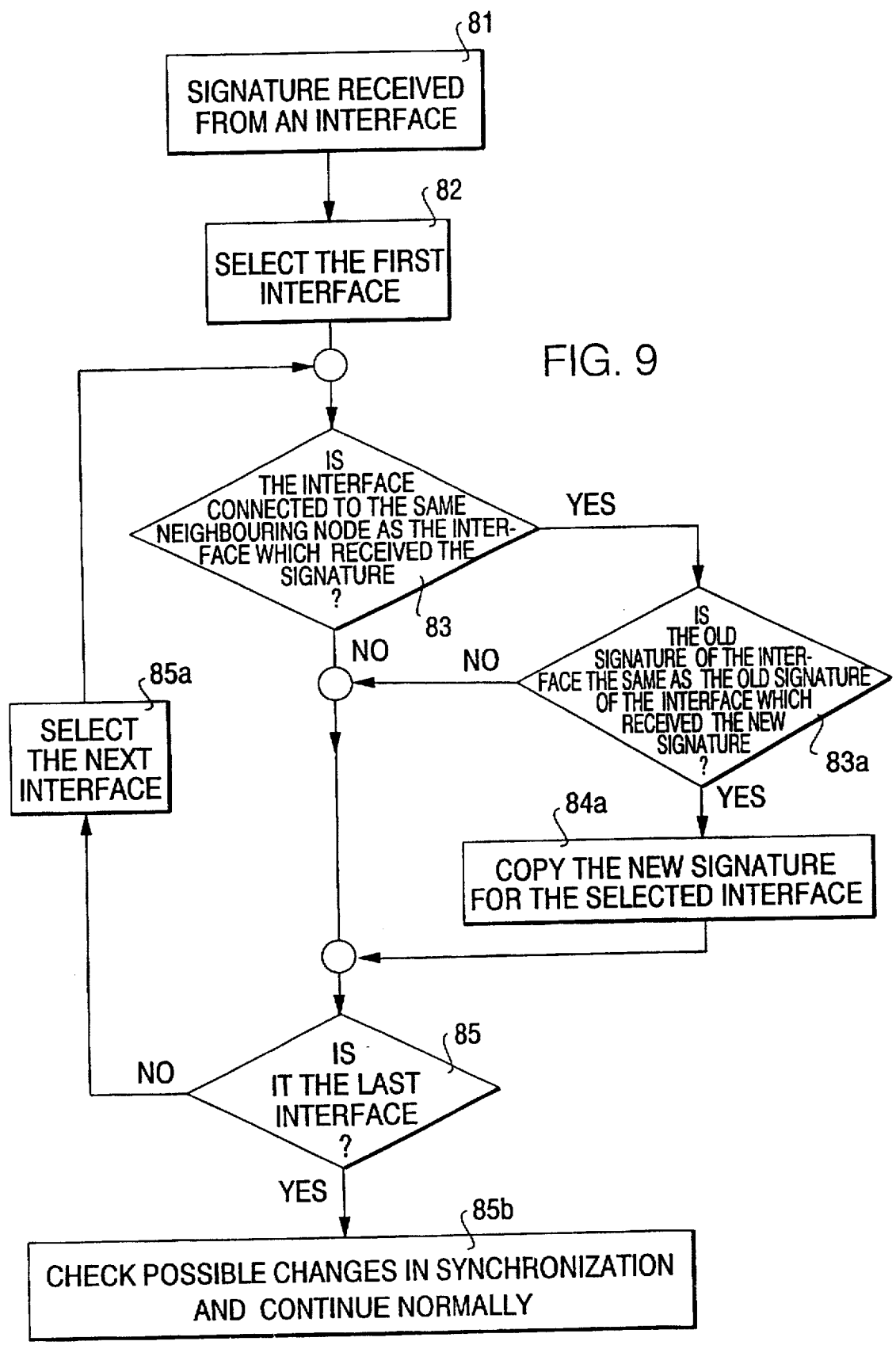

1

HIERARCHICAL SYNCHRONIZATION METHOD

This application claims benefit of international application PCT/FI95/00113, filed Feb. 28, 1995, published as WO95/24801 Sep. 14, 1995.

BACKGROUND OF THE INVENTION

The invention relates to a hierarchical synchronization method used in a telecommunications system employing message-based synchronization. The invention also relates to a node equipment, realizing such a method.

In this document, the junction points of the transmission lines in a system are called nodes. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects as the source of its own clock frequency either the frequency of a signal from a neighboring node, the frequency of its own internal clock source, or a frequency brought into the node from an external clock source through a separate synchronization input. In order that all nodes in the system would operate at the same clock frequency, the aim is usually to make the system synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritized and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighboring clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighboring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stabilized situation. Priorities assigned to the nodes are indicated by numbers within the circles representing the nodes. The smaller the number, the higher the priority of the node. Synchronization messages transmitted by a node n (n=1 ... 6) are indicated by the reference $MSG_n$. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the system nodes by assigning each node a dedicated signature indicating the hierarchical level of the node and the system synchronizes itself with the defined master clock independently by utilizing, if required, all existing internodal connections. If the connection to the master clock breaks, and no alternative connection exists, or if the master clock fails, the system synchronizes itself with a node of the next highest level of hierarchy. Response to the change in synchronization takes place by message interchange between nodes.

A message-based synchronization method of the type disclosed above is described e.g., in U.S. Pat. No. 2,986,723, which is referred to for a more detailed description. Messages used in this type of known message-based synchronization method (SOMS) are described in greater detail below in connection with FIGS. 2 and 3, since the method according to the present invention is applicable for example in this type of system.

When a node in a system employing message-based synchronization changes its outgoing message, it is usually changed in all transmission lines. The neighboring node must normally process separately the synchronization signatures contained in the messages arriving at the interfaces. In a node connected to its neighboring node by means of more than one transmission line, the synchronization with the right source may thus be slower in situations where one of the lines to the neighboring node has been selected as the source of synchronization. When the synchronization signature transmitted by the neighboring node deteriorates, it is possible that the node synchronization decision means first receives the deteriorated signature of the selected interface, whereupon the interface goes down on the priority list and the top of the list will most likely be occupied by another interface connected to the same neighboring node. After a while the decision means receives the new signature arriving at the latter interface, whereupon the interface goes down on the priority list. Even though this process is performed rapidly on all interfaces down to the last interface connected to the same neighboring node, it causes unnecessary changes and intermediate states on the priority list and slows down the synchronization of the node with the right source. A similar problem also occurs if the decision means first receives the changed signatures of the other interfaces, and the signature of the selected source is "overrun" and arrives only after the other signatures. The most significant information (a change in the signature of the interface selected as the synchronization source) is then received last, whereupon the decision-making has been unnecessarily delayed.

SUMMARY OF THE INVENTION

The purpose of the present invention is to eliminate the aforementioned drawbacks and to provide a method which ensures as fast resynchronization as possible in a node connected to a neighboring node by means of several transmission lines.

The central idea of the invention is to copy the changed synchronization signature received first from the neighboring node to immediately apply also to the other interfaces connected to the node and used for synchronization. In the most preferred embodiment of the invention the synchronization signature is copied for the other interfaces only if it has deteriorated. An improved signature may also be copied, even though this does not actually increase the performance. (A deteriorated signature means that the signature has a lower priority level than before.)

The arrangement according to the invention can be used in message-based synchronization methods where (a) a node transmits the same synchronization signature to all directions, or (b) the same signature is transmitted over each connection between two nodes, or (c) the system knows otherwise those connections between two nodes over which the same synchronization signature is transmitted. This information may be incorporated into the system already at the system set-up, or the user may define these connections.

By means of the solution according to the invention, the information central to the synchronization can be provided to the node (synchronization) decision means faster than before, unnecessary intermediate states can be avoided in change situations, and a correct decision can be made more rapidly than in known solutions.

BRIEF DESCRIPTION OF THE DRAWINGS

In the following, the invention and its preferred embodiments will be described in greater detail with reference to the examples according to FIGS. 2 to 9 in the accompanying drawings, in which:

FIG. 9 is a flow chart illustrating another preferred embodiment of the method according to the invention.

DETAILED DESCRIPTION

Figure 1:
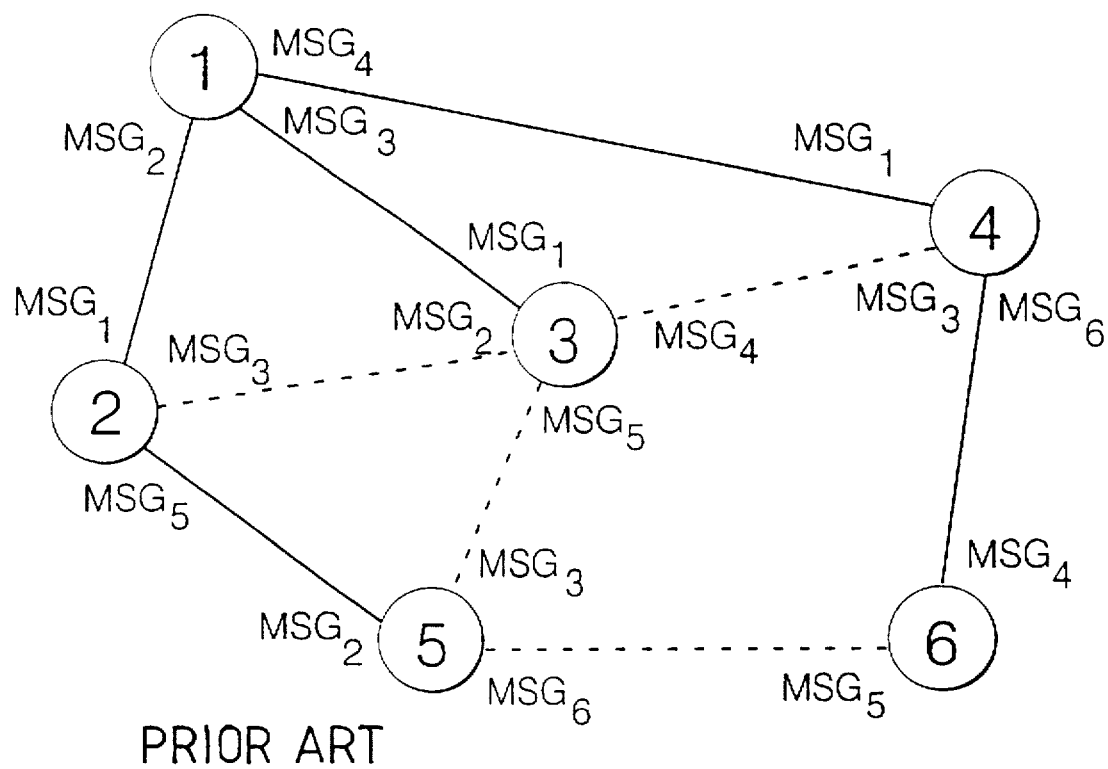
FIG. 1 shows a system employing message-based synchronization when the system is in synchronization with the clock frequency of a master source.
Figure 2:
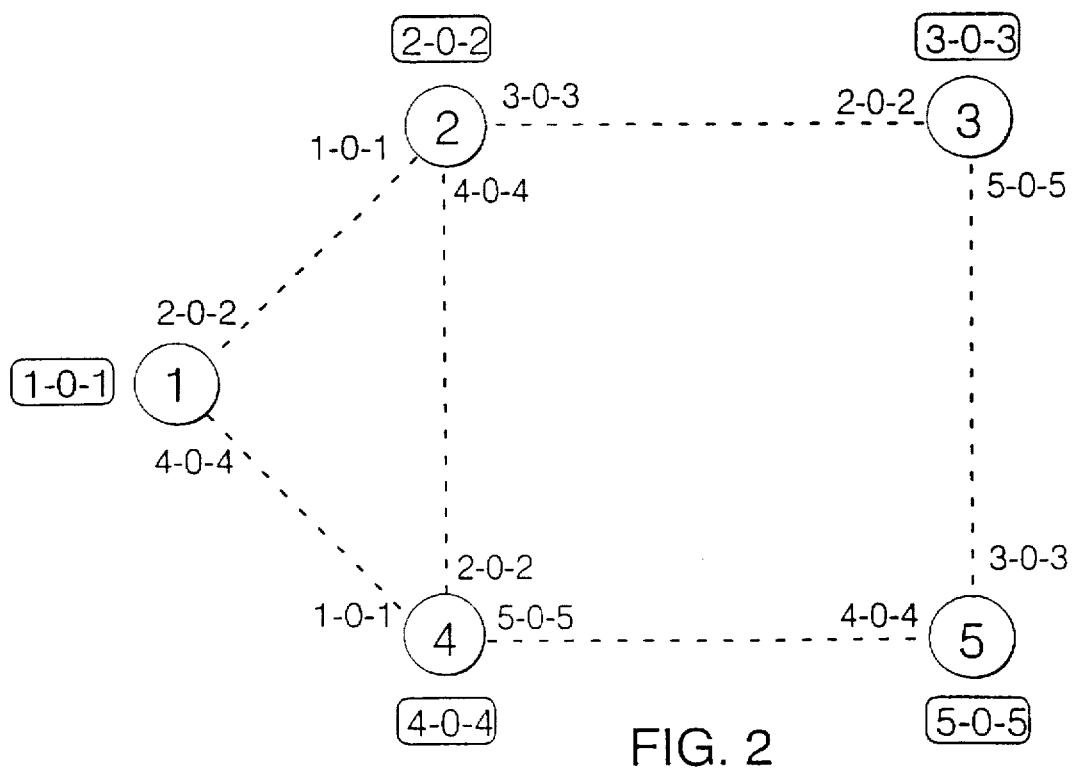
FIG. 2 shows a network employing self-organizing master-slave synchronization (SOMS) in an initial state.

FIG. 2 illustrates a system employing the aforementioned self-organizing master-slave synchronization (SOMS), which is a message-based synchronization method known per se. In this specific case, the system comprises five nodes (or devices) which are indicated by the reference numerals 1 ... 5 according to their level of hierarchy. (Each number forms the SOMS address of the node, and the master node of the network has the smallest SOMS address.) The nodes interchange messages containing such SOMS addresses. In this way, the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a parameter describing the quality of a connection, and it is typically a distance to a node indicated by D1. The distance is given as the number of intermediate nodes.

D3 is the SOMS address of a transmitting node.

The parameter most central to the present invention is possibly D3, since by means of this parameter it is possible to detect which interfaces are connected to the same neighboring node.

Each node (or device) compares continuously incoming SOMS signatures with each other and selects the smallest among them. In the signature, the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master code, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighboring nodes as its new synchronization source on the basis of an incoming SOMS signature, it has to regenerate its own (outgoing) SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of its clock frequency. Of course, the outgoing SOMS message thereby employs the internal SOMS signature.

The nodes transmit continuously SOMS messages in all directions in order that any changed data in the SOMS signatures would be distributed as rapidly as possible and that they would know the current operating condition of neighboring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until (for example) three successive faulty SOMS messages have been received. At this stage the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to (for example) three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 2, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 2, the SOMS signatures are indicated beside each node to which they are transmitted, and the selected signature is framed (in the initial situation shown in FIG. 2 all nodes employ their internal timing source). Lines used in synchronization are drawn by a continuous line and standby lines are drawn by a broken line (in the initial situation shown in FIG. 2, all lines are standby lines).

Figure 3:
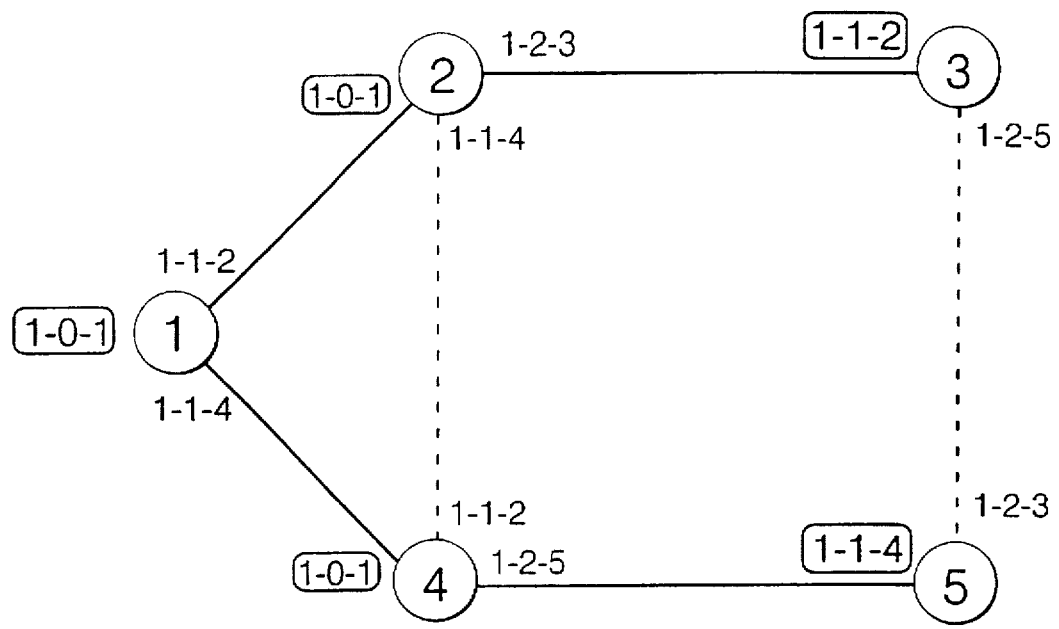
FIG. 3 shows the network of FIG. 2 in a stable state.

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time the nodes generate their own new SOMS signatures as described above and provide their outgoing SOMS message with the new signature. The network in a stable situation is shown in FIG. 3. All nodes have synchronized with the master node 1 over the shortest possible path.

If the smallest one of the SOMS signatures entering the node changes or is lost totally when the connection fails, the node selects a new synchronization direction on the basis of the second smallest SOMS signature. Prior to this, however, the node is forced to change over to internal timing, which it retains for a preset time period in order for any faulty SOMS signatures occurring in the network to be eliminated. For instance, if node 1 in the situation of FIG. 3 should fail, nodes 2 and 4 would no longer receive the signature 1-0-1, with which they were synchronized. If they now accepted immediately the second smallest SOMS signature, the network would no longer be synchronized with a single master node but a synchronization loop would result. When node 1 fails, node 2 still receives the signatures 1-1-4 and 1-2-3, and node 4 receives the signatures 1-1-2 and 1-2-5, as nodes 3 and 5 have not yet responded to the changed situation. If the second smallest signatures were accepted immediately, node 2 would be synchronized with node 4, and node 4 with node 2. This situation is prevented by the above-mentioned forced state of internal timing, in which the nodes start to use their own internal timing source and transmit their own internal SOMS signature (X-O-X). Nodes which were synchronized with the node now in the state of internal timing detect that a change has occurred in the network and that the SOMS message on which the former synchronization was based is no longer valid as it has been changed into the internal SOMS message of the neighboring node. As a consequence, the nodes also enter into the forced state of internal timing for a preset time period.

Figure 4:
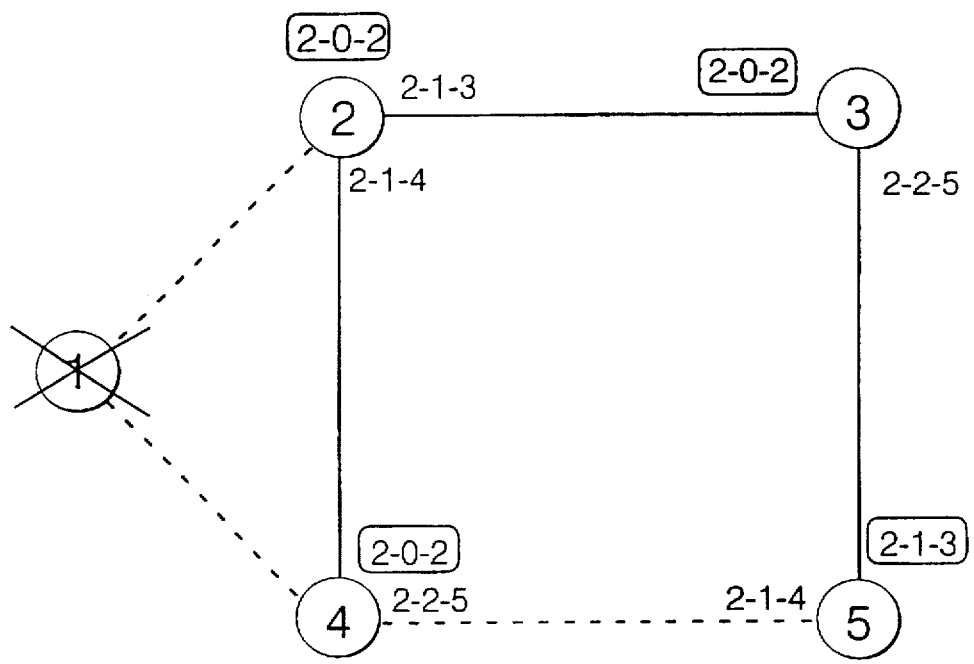
FIG. 4 illustrates the resynchronization of the network of FIG. 3 when the master node has failed.
Figure 5:
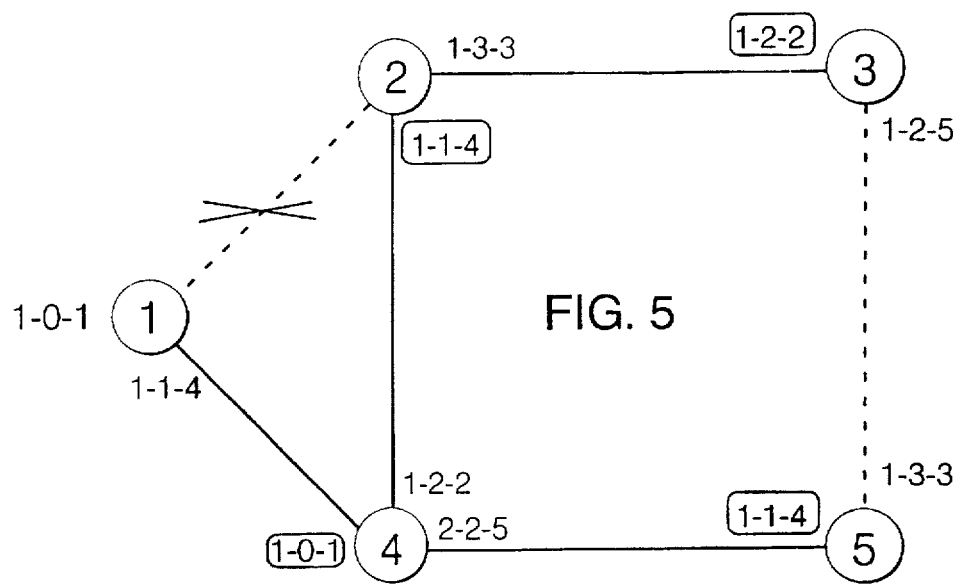
FIG. 5 illustrates the resynchronization of the network of FIG. 3 when a connection between two nodes has failed.

If the master node fails in the case of FIG. 3, the nodes 2 and 4 are immediately forced to enter into the state of internal timing when they lose the incoming SOMS signature 1-0-1. When the nodes 3 and 5 detect the change that has taken place in the nodes 2 and 4, they are also forced to enter into the state of internal timing. When node 2 reverts to the normal state, it receives the internal SOMS signatures (3-0-3 and 4-0-4) from the nodes 3 and 4 and retains the use of the internal timing as the SOMS signatures received from outside are not smaller than its own internal signature (2-0-2). Node 4 is then synchronized with node 2. After having stabilized, the network is in the state shown in FIG. 4, where node 2 is the new master node of the network. If for example only the connection between the nodes 1 and 2 breaks (FIG. 5), only node 2 is forced into the state of internal timing. On reverting to the normal state it synchronizes itself with node 4 having a connection to the master node of the network. After the stabilization of the entire network, the synchronization still originates from node 1 despite the break. This is illustrated in FIG. 5.

If there are several transmission lines, used for synchronization, between two nodes in the above-described network employing message-based synchronization, and if one of these lines to the neighboring node is selected as the primary source of synchronization, a change in the signature transmitted by the neighboring node may cause alterations in the node synchronization. It is then possible, as described above, that the correct outcome is achieved only through several intermediate states.

Figure 6:
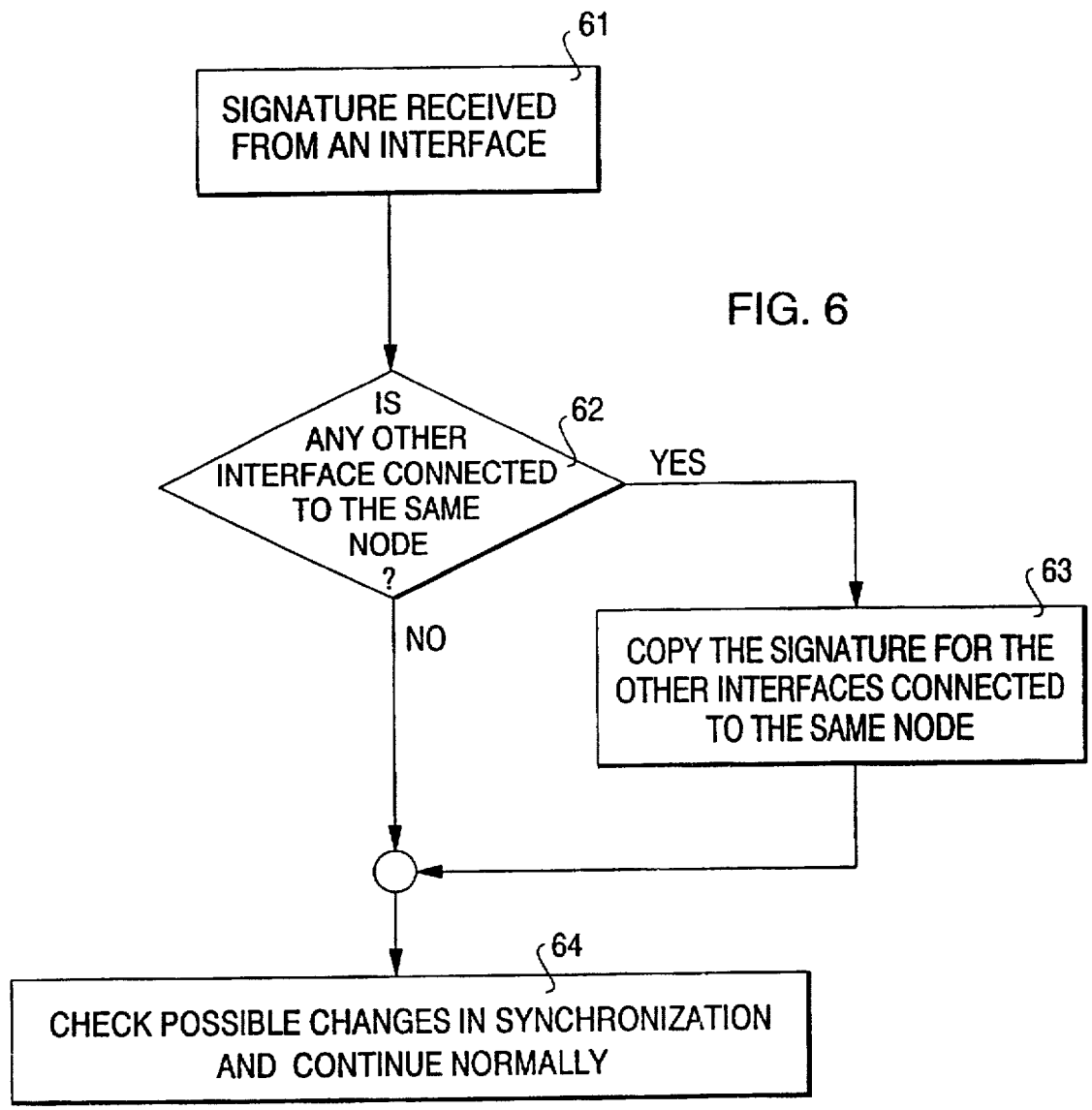
FIG. 6 is a flow chart illustrating the general principle of the method according to the invention.

In order that correct decisions concerning synchronization could be made rapidly also in such change situations, the method according to the invention follows the general principle illustrated in FIG. 6. Whenever the node control unit has received (step 61) a changed signature from one of the interface units of the node (one interface unit may comprise one or several interfaces), it examines whether another interface is possibly connected to the same (neighbouring) node (step 62). If it is, the signature is copied to also apply to all the other interfaces connected to the same (neighbouring) node (step 63). The node checks only after this the possible changes: in synchronization (changes the priority list, if required, and forms a possibly required new outgoing signature) and continues its normal operation (step 64). If it is detected in step 62 that no other interfaces are connected to the same (neighboring) node, the node enters directly into step 64.

The idea of the invention is thus to copy the first changed signature to immediately apply also to the other interfaces connected to the same node (if the signals of these interfaces are used for synchronization).

It should also be noted that in FIG. 6 step 61 only concerns the signature, even though the inventive idea primarily relates to the changed signature. However, it is possible in principle that the node control unit asks each interface for its incoming signature, which is then processed as if the interface had transmitted itself its own signature during a change situation, i.e. the signature from the interface is copied to also apply to the other interfaces connected to the same neighbouring node and used for synchronization. Therefore, this possibility should not be excluded either. However, the examples below relate to a situation where the process is started by a change in the signature.

Figure 7:
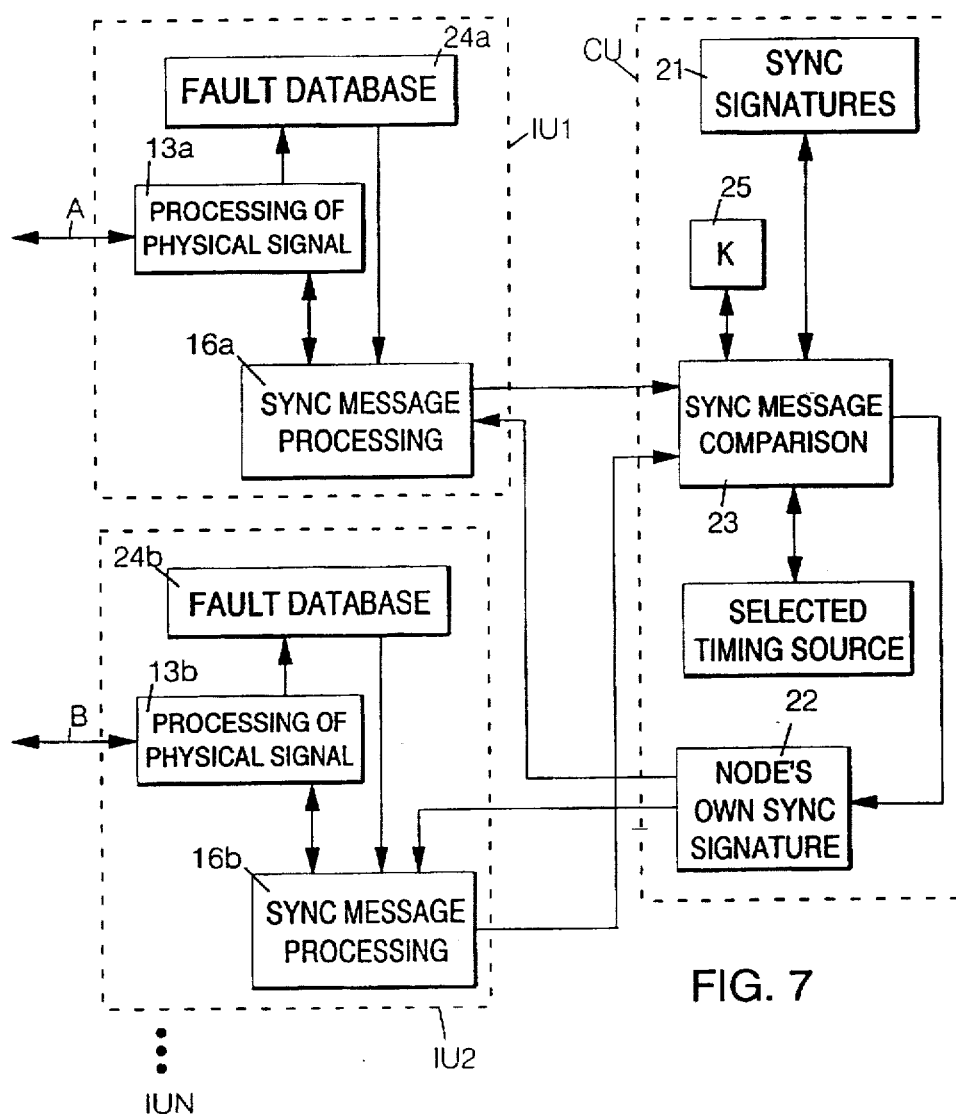
FIG. 7 shows means provided in each individual node for realizing the method according to the invention.

FIG. 7 shows means provided in each node for realizing the method according to the invention. The general structure of the node comprises several parallel interface units IU1, IU2 . . . IUN each of which is connected to a neighboring node, and a control unit CU which is shared by all interface units and which is the location of decision-making concerning the synchronization. The figure shows two transmission connections A and B between a system node and neighbouring nodes, both connections being connected to their own interface unit. One interface unit may also comprise several interfaces one or several of which may be connected to the same node. The transmission connections are typically for example PCM lines of 2 Mbit/s complying with the CCITT (currently ITU-T) recommendations G.703 and G.704, or SDH lines according to the recommendations G.708 and G.709. Synchronization messages can be transmitted in different ways in such signals; one example is disclosed in the co-pending Finnish Patent Application 940926 which also describes the general structural models of the node.

Each transmission connection is connected to a signal transmission and reception means 13a and 13b, respectively, which process the physical signal. The means 13a and 13b forward the synchronization message to an associated synchronization message transmission and reception means 16a and 16b, respectively. The transmission and reception means 16a and 16b for example check whether the message is faultless and forward the message to a centralized node synchronization decision means 23 having a respective input connected to the output of the respective transmission and reception means 16a, 16b. The signal transmission and reception means 13a and 13b also supervise the quality of the received signal and store information thereon into interface-specific fault databases 24a and 24b, respectively. The synchronization message transmission and reception means 16a obtains fault data from the database 24a and the transmission and reception means 16b from the fault database 24b, respectively. The signal transmission and reception means monitor failures/changes in the connection in a manner known per se.

The decision means 23 of the control unit CU compares the messages and stores them in a memory 21, e.g. in priority order so that the selected synchronization signature always has the highest status. The decision means also receives the fault data of a signal from the corresponding interface unit in the form of a synchronization message (the signature then being in the form MAX-MAX-MAX) or as separate fault data. When the decision means judges from the supplied data that the node has to enter into the standard state for the preset time period, it selects the source of its timing as defined in the applied synchronization method for this kind of situation; it applies an appropriate synchronization signature to the interface-specific synchronization message transmission and reception means 16a and 16b from a memory 22 (where it generates an outgoing signature used in each particular case), and starts a timer means 25. The node informs the neighboring nodes about the change that has occurred by transmitting the new signature. When the timer means 25 indicates that the preset time period K has expired, the decision means 23 is again allowed to select the source of timing according to a normal procedure.

The node decision means 23 has in its memory information of the synchronization signatures from all interfaces. The decision means forms of these signatures a ready priority list in which each node interface (interface number) is in the place determined by its incoming signature in such a way that the top of the list is occupied by the interface corresponding to the selected signature, the next one is the interface receiving the signature on the second highest level, etc. By means of this priority list, the decision means can form for the node a separate synchronization list comprising the top of the priority list, for example the first three interfaces. The decision means stores also this synchronization list in the memory. The following table shows one example of forming a priority list and a synchronization list on the basis of signatures entering a node.

| Incoming signatures | | Priority list | | Synchronization list | |
|---|---|---|---|---|---|
| Interface | Signature | Level | Interface | Level | Interface |
| 1 | 2-4-7 | I | 6 | I | 6 |
| 2 | 2-4-9 | II | 3 | III | 3 |
| 3 | 2-3-10 | III | 1 | III | INT |
| 4 | 2-4-14 | IV | 2 | — | |
| 5 | 2-4-11 | V | 5 | | |
| 6 | 2-3-10 | VI | 4 | | |
| INT | 20-0-20 | VII | INT | | |

The basic data for forming a synchronization list consists of the incoming signatures and the SOMS address (20) of the node. The incoming signatures also include an interface INT which corresponds to the node-internal oscillator, the frequency of which can be used (in failure situations) as the timing source. The internal signature is formed as described above on the basis of the node's own SOMS address. The timing source could also be provided by a direct external synchronization input which would receive the signature determined by the user when the incoming clock signal would be in order.

A priority list is formed as described above by placing all timing sources in an order of quality on the basis of their signatures. The first two interfaces (6 and 3) have been selected from this list onto the three-level synchronization list, the interfaces being connected to the same neighboring node (node no. 10). The third level of the synchronization list is occupied in this exemplary case by the internal timing.

If the synchronization signature arriving at the selected interface 6 changes, the changed signature is immediately copied, according to the invention, also for interface 3 on the lists above.

Figure 8:
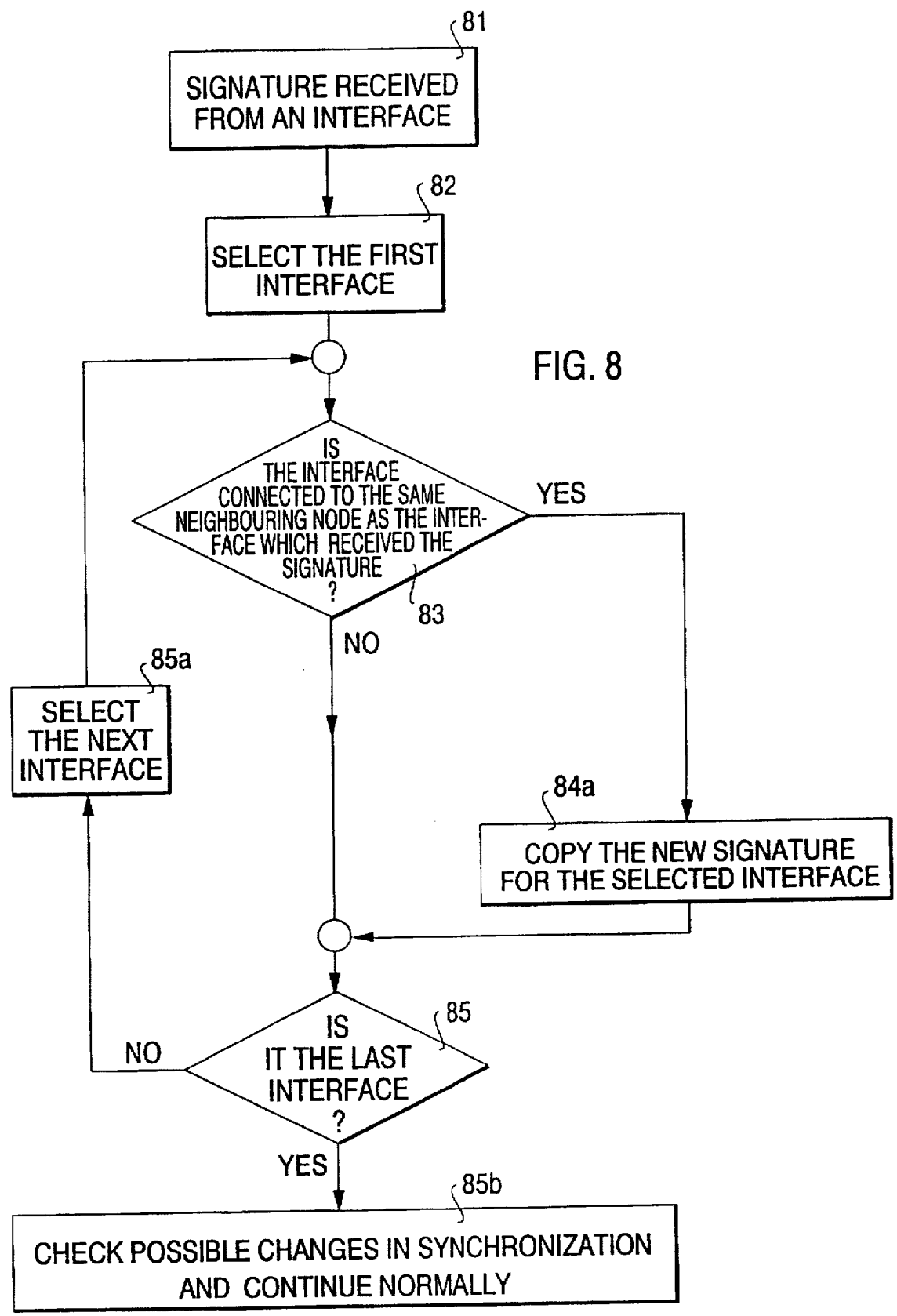
FIG. 8 is a flow chart illustrating the most preferred embodiment of the method according to the invention.

FIG. 8 shows the realization of the copying procedure in the decision means 23. Whenever the node control unit has received (step 81) a changed signature from one of the node interfaces, the decision means selects the first interface from among the interfaces on the priority list (step 82) and examines whether it is connected to the same neighboring node as the interface which received the changed signature (step 83).

In the SOMS network this examination may be conducted for example by utilizing the third part D3 of the synchronization signature, the part indicating the SOMS address of the node transmitting the signature. (Two nodes must not have the same SOMS address in the network.) When other message-based synchronization method are used, the aforementioned information must be added to the synchronization messages to be transmitted if this information is not otherwise used in the method.

As an alternative to the use of the SOMS address, the user may define which interfaces are connected to the same neighbouring node.

If the decision means detects that the selected interface is connected to the same neighboring node as the interface which received the signature, it copies the new signature also for the selected interface (step 84a).

It is then examined whether the selected interface was the last interface on the priority list (step 85). This stage is entered into directly after step 83, if the examination in that step resulted in a negative result. If the interface is the last one, the changes possibly caused in the synchronization by the new situation are checked, and the operation is continued normally (step 85b). If the interface is not the last one, the decision means selects the next interface (step 85a) and then continues the procedure again from step 83. In practice the interfaces may also be examined for example in numerical order (instead of the order of priority).

It is possible to add to this most preferred embodiment an additional checking step 83a between steps 83 and 84a as shown in FIG. 9, this step comprising the examination of whether the (old) signature of the selected interface is the same as the old signature of the interface which received the new signature. If it is, copying is performed, but otherwise step 85 is entered into. The purpose of this additional step is for example to avoid unnecessary writing (writing of the signature over a signature having the same value). This is important especially in cases where the operating life of the memory used is measured in numbers of writing operations. In addition to unnecessary writing, it is also possible to avoid the checking of the changes on the priority list. (When a signature is written for an interface, it is examined whether it causes any changes on the priority list. If it is detected in the additional checking step that copying is not necessary, the checking of the priority list can also be avoided). The additional step 83a also provides further backup for step 83.

It is also possible to check before the copying whether the signal of the selected interface is in order. The new signature is then copied for the signature corresponding to the interface only if its signal is in order. This checking must be performed, if the faults of the signal are encoded in its signature (in a failure situation the signature has for example the form of MAX-MAX-MAX). If the faulty status is stored separately it is own fault database, the signature can be copied also for the faulty interfaces, if desired, since they will not be used as the source of synchronization on the basis of the fault database.

According to another embodiment of the invention, copying can also be utilized when a node of an external system is connected to a message-based system by means of at least two transmission lines. If the synchronization status of the node of the external system can be transmitted to the message-based system, copying can also be used similarly for interfaces connected to the node of the external system, if in the synchronization method employed by the external system the node transmits the same signature to all directions, or if the same message, as far as synchronization is concerned, is transmitted at least over several connections between two nodes. Finnish Patent Application 940927 describes in greater detail the connection of an external system to a message-based system in such a way that the synchronization status of the external system can be transmitted to the message-based system.

If the node uses an external synchronization source, it is possibly necessary, depending on the situation, to first (before steps 61 and 81 in FIGS. 6 and 8, respectively) examine whether the signature originated in a normal interface, a separate synchronization input, or some other separate external source. If the signature arrives from a normal interface, it may be a synchronization signature transmitted by a neighboring node. It might be necessary to examine then whether the signature is a signature from a neighboring node or possibly a standard signature (if the node utilizes them) which the signal has been provided with at the interface. The above-described steps are only started after these examinations, when it is sure that the signature has arrived from a neighboring node.

Even though the invention is described above with reference to the examples according to the accompanying drawings, it is clear that the invention is not restricted thereto, but it may be modified within the inventive idea disclosed above and in the appended claims. Even though the SOMS system has been used as an example above, the solution according to the invention is applicable in all message-based systems where the node transmits the same synchronization signature to all directions, or the same signature is transmitted over each connection between two nodes, or the system otherwise knows the interfaces between two nodes over which the same synchronization signature is transmitted. The priority and/or synchronization list should also be understood as a list or table generally describing the incoming signatures and the corresponding interfaces.

I claim:

1. A hierarchical synchronization method for a telecommunications system employing message-based synchronization and comprising a plurality of nodes interconnected by transmission lines, comprising the steps of:

the nodes interchanging signals containing synchronization messages each with a synchronization signature indicating the priority of the corresponding signal in the internal synchronization hierarchy of the system, there being several transmission lines between two nodes and the same synchronization signature being transmitted over more than one of these transmission lines, and when the synchronization signature from a neighboring node connected to several node interfaces changes, a respective node copying the new signature of the interface which first received the changed signature to immediately apply also to the other interfaces connected to the same neighboring node, and using the new signature for synchronization.

2. The method according to claim 1, comprising:
considering only a deterioration of a synchronization signature as a change in said signature.

3. The method according to claim 1, comprising:
before copying the changed signature for the signature corresponding to the interface, examining whether the signal received by the interface is appropriate for synchronization and performing said copying only for interfaces having signals which are found to be appropriate.

4. The method according to claim 1, comprising:
before copying the changed signature for the signature corresponding to the interface, examining whether the signature previously received by the interface is the same as the old signature of the interface which received the changed signature. and performing said copying only if said examining has a positive result.

5. A hierarchical synchronization method for a telecommunications system employing message-based synchronization and comprising a plurality of nodes interconnected by transmission lines, comprising the steps of:

the nodes interchanging signals containing synchronization messages each with a synchronization signature indicating the priority of the corresponding signal in the internal synchronization hierarchy of the system, there being several transmission lines between two nodes and the same synchronization signature being transmitted over more than one of these transmission lines, and a respective node automatically receiving from its interfaces an indication of the synchronization signatures they have received, the respective node thereupon copying the signature received from one send interface to immediately apply also to the respective other interfaces connected to the same neighboring node, and using the copied signature for synchronization.

6. The method according to claim 5, comprising:

of the interfaces connected to the same neighboring node only the signature of the interface providing the first signature being copied.

7. A node equipment for a telecommunications system employing message-based synchronization and comprising a plurality of nodes interconnected by transmission lines, comprising:

several interfaces to which transmission lines to neighboring nodes are connected, means for forming a synchronization signature to be transmitted between the nodes from a signal received at an interface, said synchronization signature indicating the priority of the corresponding signal in the internal synchronization hierarchy of the system, means for comparing the synchronization signatures received from interfaces with each other in order to select the signature with the highest priority as the source of the node synchronization, and means for forming a node outgoing synchronization signature on the basis of the selected synchronization signature, said comparing means comprising copying means for copying the synchronization signature of an interface to relate to the interfaces connected to the same neighboring node before the comparing means perform the comparison and selection.

8. The node equipment according to claim 7, wherein:

said copying means are responsive to changes in the synchronization signatures received at respective of said interfaces.

* * * * *